United States Patent
Oroskar et al.

(10) Patent No.: US 9,369,937 B1
(45) Date of Patent: Jun. 14, 2016

(54) LONG TERM EVOLUTION (LTE) NETWORK HAND-OVER CONTROL BASED ON QUALITY-OF-SERVICE CLASS INDICATOR (QCI) COMBINATIONS

(71) Applicant: Sprint Communications Company L.P., Overland Park, KS (US)

(72) Inventors: Siddharth Oroskar, Overland Park, KS (US); Maulik K. Shah, Austin, TX (US); Jasinder Pal Singh, Olathe, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 167 days.

(21) Appl. No.: 14/329,301

(22) Filed: Jul. 11, 2014

(51) Int. Cl.
*H04W 36/30* (2009.01)
*H04W 24/08* (2009.01)

(52) U.S. Cl.
CPC .............. *H04W 36/30* (2013.01); *H04W 24/08* (2013.01)

(58) Field of Classification Search
CPC ............ H04W 36/00; H04W 36/0005; H04W 36/0011; H04W 36/0083; H04W 36/30; H04W 24/08; H04W 76/00; H04W 76/02
See application file for complete search history.

(56) References Cited

U.S. PATENT DOCUMENTS

| | | | |
|---|---|---|---|
| 8,514,786 B2 | 8/2013 | Okabe et al. | |
| 8,705,503 B2 * | 4/2014 | Yang | H04W 12/06 370/230 |
| 2012/0212569 A1 | 8/2012 | Lei | |
| 2012/0224564 A1 | 9/2012 | Paisal et al. | |
| 2013/0051332 A1 | 2/2013 | Sridhar | |
| 2013/0063540 A1 | 3/2013 | Zisimopoulos et al. | |
| 2015/0085759 A1 * | 3/2015 | Gajula | H04W 72/02 370/329 |
| 2015/0085829 A1 * | 3/2015 | Bawaskar | H04W 36/30 370/332 |

FOREIGN PATENT DOCUMENTS

WO 2013050061 A1 4/2013

* cited by examiner

*Primary Examiner* — Anh Ngoc Nguyen

(57) ABSTRACT

A Long Term Evolution (LTE) network wirelessly exchanges data with User Equipment (UE) over multiple data bearers having a combination of Quality-of-Service Class Indicators (QCIs). The LTE network wirelessly receives radio measurement data from the UE for a voice communication network and for a data communication network. The LTE network determines at network-selection parameters based on the combination of the QCIs for the UE. The LTE network processes the radio measurement data based on the network-selection parameters to select the data communication network for the UE instead of the voice communication network.

20 Claims, 6 Drawing Sheets

| QCI COMBO | VOICE NETWORK HANDOVER PARAMETERS | | VISITED LTE NETWORK HANDOVER PARAMETERS | | WIFI NETWORK HANDOVER PARAMETERS | |
|---|---|---|---|---|---|---|
| | SIGNAL STRENGTH DELTA | HYSTERESIS TIMER | SIGNAL STRENGTH DELTA | HYSTERESIS TIMER | SIGNAL STRENGTH DELTA | HYSTERESIS TIMER |
| 1, 5, 9 | 3dB | 5 mS | 4dB | 10 mS | 5dB | 15 mS |
| 1,2,5,9 | 4dB | 10 mS | 3dB | 5 mS | 5dB | 15 mS |
| 1,3,5,9 | 4dB | 10 mS | 3dB | 5 mS | 5dB | 15 mS |
| 1,4,5,9 | 4dB | 10 mS | 3dB | 5 mS | 5dB | 15 mS |
| 1,3,5,9 | 4dB | 10 mS | 3dB | 5 mS | 5dB | 15 mS |
| 1,5,6,7 | 4dB | 10 mS | 3dB | 5 mS | 5dB | 15 mS |
| 1,3,5,7 | 4dB | 10 mS | 3dB | 5 mS | 5dB | 15 mS |
| 1,4,5,7 | 4dB | 10 mS | 3dB | 5 mS | 5dB | 15 mS |
| 1,2,5,7 | 4dB | 10 mS | 3dB | 5 mS | 5dB | 15 mS |
| · · · · | · · · · | · · · · | · · · · | · · · · | · · · · | · · · · |

FIGURE 6

LONG TERM EVOLUTION (LTE) NETWORK HAND-OVER CONTROL BASED ON QUALITY-OF-SERVICE CLASS INDICATOR (QCI) COMBINATIONS

TECHNICAL BACKGROUND

In the field of wireless communications, Long Term Evolution (LTE) networks provide User Equipment (UE) with internet access and voice calling services. Exemplary voice calling services include Voice over LTE (VoLTE) and Single Radio Voice Call Continuity (SR-VCC). The UE often has a choice of networks that include both home and visited LTE networks. The UE may also use other wireless voice and data networks, such as Wireless Fidelity (WiFi), Code Division Multiple Access (CDMA), Global System for Mobile communication (GSM), and the like.

The home LTE network provides various connections to the UE that are referred to as bearers. Some "default" bearers are automatically set-up when a UE registers with the LTE network. Other "dedicated" bearers are set-up when the UE requests services from the LTE network. Thus, an LTE UE may have multiple simultaneous bearers for voice calling, messaging, gaming, video, file transfers, internet browsing, and the like. Each bearer is assigned a Quality of Service (QoS) that is designated by a QoS Class Indicator (QCI). Thus, the QCI indicates the quality of an LTE network connection. Different services—such as voice calling, messaging, gaming, video, file transfers, internet browsing, are associated with different QCIs.

As the UEs move about, they may leave the coverage area of their home LTE network. To prepare for a transfer to another network, the UE takes radio measurements of various networks and reports this radio network data to the home LTE network. The home LTE network processes the radio data from the UE to select a new network for the UE if the home LTE network continues to fade.

If the UE is a VoLTE or Single Radio Voice Call Continuity (SR-VCC) device, then the home LTE network typically drives the UE to the best available voice network. Since the voice network may not support all of the bearers and QCIs of the home LTE network, many bearers are typically lost or suspended on a transfer to the voice network. Unfortunately, the techniques and systems that select networks in this scenario are not efficient or effective.

Technical Overview

A Long Term Evolution (LTE) network wirelessly exchanges data with User Equipment (UE) over multiple data bearers having a combination of Quality-of-Service Class Indicators (QCIs). The LTE network wirelessly receives radio measurement data from the UE for a voice communication network and for a data communication network. The LTE network determines network-selection parameters based on the combination of the QCIs for the UE. The LTE network processes the radio measurement data based on the network-selection parameters to select the data communication network for the UE instead of the voice communication network.

DESCRIPTION OF THE DRAWINGS

FIGS. 5-6 illustrate an LTE eNodeB and data structure to control hand-overs for LTE UEs based on their individual QCI combinations.

DETAILED DESCRIPTION

Figure 1:
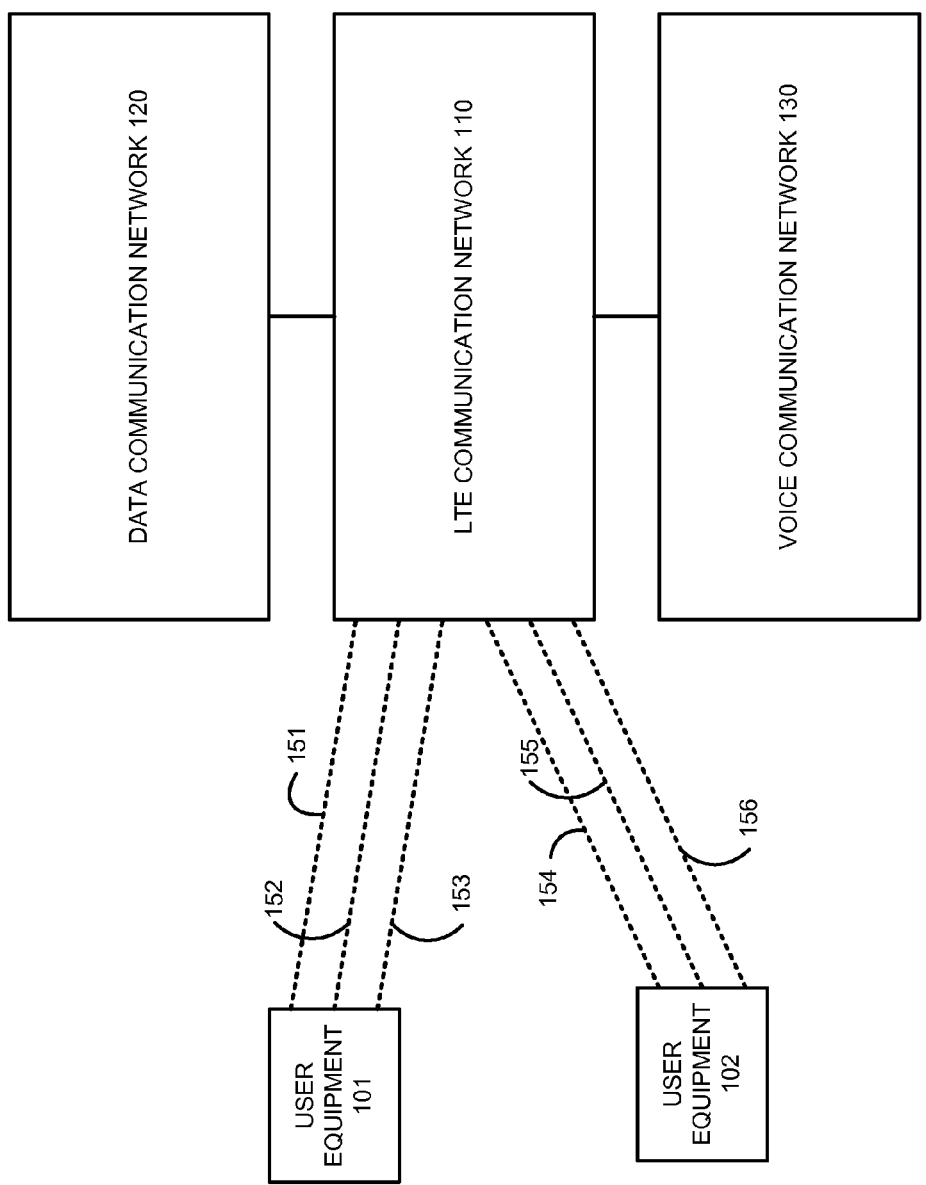
FIGS. 1-2 illustrate a communication system to control hand-overs from an LTE network for UEs based on their individual QCI combinations.

FIG. 1 illustrates communication system 100 to control hand-overs from Long Term Evolution (LTE) network 110 for User Equipment (UE) 101 and UE 102 based on their individual Quality-of-Service Class Indicator (QCI) combinations. Communication system 100 comprises UEs 101-102, LTE communication network 110, data communication network 120, and voice communication network 130. UEs 101-102 comprise phones, computers, media players, internet appliances, and/or some other apparatus having wireless transceiver components. Networks 110, 120, and 130 comprise computer and communication circuitry, data storage equipment, and associated software/hardware components.

LTE communication network 110 comprises access points, management systems, gateways, links, databases, servers, and/or some other network elements. Data communication network 120 utilizes formats such as LTE, High Rate Packet Data (HRPD), Evolution Data Optimized (EVDO), Wireless Fidelity (WiFi), Worldwide Interoperability for Microwave Access (WiMAX), or some other wireless data communication protocol. Voice communication network 130 utilizes formats such as Code Division Multiple Access (CDMA), Global System for Mobile Communications (GSM), Voice Over Internet Protocol (VOIP), Public Switched Telephone Network (PSTN), or some other voice calling protocol.

UE 101 and LTE communication network 110 establish bearers 151-153 to exchange wireless data. UE 102 and LTE communication network 110 establish bearers 154-156 to exchange wireless data. Wireless bearers 151-156 each have an associated QCI. The QCIs have associated priorities, latencies, error rates, bandwidths, and services. For example, bearers 151-153 between UE 101 and LTE communication network 110 may have the QCI combination 1, 5, and 7. Bearers 154-156 between UE 102 and LTE communication network 110 may have the different QCI combination 1, 3, and 5. UEs 101-102 may use various numbers of bearers and QCI combinations.

LTE communication network 110 wirelessly receives radio measurement data from UEs 101-102 for communication networks 110, 120, and 130. The radio measurement data indicates network identifications, radio signal strengths, data latencies, data errors, noise levels, and/or some other communication characteristics. LTE communication network 110 determines network-selection parameters for UE 101 based on its combination of QCIs for bearers 151-153. LTE communication network 110 also determines network-selection parameters for UE 102 based on its combination of QCIs for bearers 154-156. The network-selection parameters might be signal strength differences, hysteresis control timers, network loading, radio noise levels, and the like.

LTE communication network 110 processes the radio measurement data for UE 101 based on its network-selection parameters to select data communication network 120 for UE 101 instead of LTE communication network 110 or voice communication network 130. LTE communication network 110 processes the radio measurement data for UE 102 based on its network-selection parameters to select data communication network 120 for UE 102 instead of LTE communication network 110 or voice communication network 130. Thus, LTE network 110 performs network selection for a given UE based on its radio measurement data and its combination of QCIs.

In some examples, the combination of the QCIs comprises multiple Guaranteed Bit Rate (GBR) QCIs. For example, a combination of bearers might comprise QCIs 1, 3, 4, and 5. The network-selection parameter may comprise an increase in the signal strength difference that triggers a hand-over to voice communication network 130. Thus, the signal strength difference used by LTE network 110 to trigger a hand-over to voice network 130 is greater for multiple GBR bearers than for a single GBR voice bearer (QCI=1). As a result, LTE communication network 110 holds onto the UE for a longer time to preserve the multiple GBR bearers that would probably be lost on a hand-over to voice communication network 130.

The additional time may allow LTE network 110 to hand the UE over to data communication network 120 instead of voice communication network 130. Data communication network 120 may be able to support multiple bearers that include a voice channel. The network-selection parameter may comprise a decrease in the signal strength difference that triggers a hand-over to data communication network 120. Thus, the signal strength difference used by LTE network 110 to trigger a hand-over to data communication network 120 is lower for multiple GBR bearers than for a single GBR voice bearer (QCI=1).

In some examples, the combination of the QCIs comprises multiple non-GBR QCIs. For example, a combination of bearers might comprise QCIs 1, 5, 6, and 7. The network-selection parameter may comprise an increase in the signal strength difference that triggers a hand-over to voice communication network 130. Thus, the signal strength difference used by LTE network 110 to trigger a hand-over to voice network 130 is greater for multiple non-GBR bearers than for a single non-GBR voice bearer (QCI=5). As a result, LTE communication network 110 holds onto the UE for a longer time to preserve the multiple non-GBR bearers that would probably be suspended on a hand-over to voice communication network 130.

The additional time may allow LTE network 110 to hand the UE over to data communication network 120 instead of voice communication network 130. Data communication network 120 may be able to support multiple bearers that include a voice channel. The network-selection parameter may comprise a decrease in the signal strength difference that triggers a hand-over to data communication network 120. Thus, the signal strength difference used by LTE network 110 to trigger a hand-over to data communication network 120 is lower for multiple non-GBR bearers than for a single non-GBR voice bearer (QCI=5).

Consider an example where a UE 102 has LTE bearers 153-154 with the QCI combination of 1 (voice call) and 2 (video call). Additional bearers and QCIs could be present. The user may desire to protect their QCI 2 video bearer over their QCI 1 voice bearer—even if the voice bearer is subsequently replaced or released. Thus, the signal strength difference used by LTE network 110 to trigger a hand-over to voice network 130 is greater for the QCI combination of QCI 1 and QCI 2 than for a QCI combination having QCI 1 and not QCI 2. LTE communication network 110 holds onto UE 102 for an additional time to preserve the QCI 2 video bearer that might be lost on a hand-over to voice communication network 130. The additional time may allow LTE network 110 to hand UE 102 over to data communication network 120 where UE 102 can likely obtain adequate video and voice channels. The signal strength difference used by LTE network 110 to trigger a hand-over to data communication network 120 is lower for the QCI combination of QCI 1 and QCI 2 than for a QCI combination having QCI 1 and not QCI 2.

Consider an example where a UE 102 has LTE bearers 153-154 with the QCI combination of 1 (voice call) and 3 (interactive gaming). Additional bearers and QCIs could be present. The user may desire to protect their QCI 3 gaming bearer over their QCI 1 voice bearer—even if the voice bearer is subsequently replaced or released. Thus, the signal strength difference used by LTE network 110 to trigger a hand-over to voice network 130 is greater for the QCI combination of QCI 1 and QCI 3 than for a QCI combination having QCI 1 and not QCI 3. LTE communication network 110 holds onto UE 102 for an additional time to preserve the QCI 3 gaming bearer that might be lost on a hand-over to voice communication network 130. The additional time may allow LTE network 110 to hand UE 102 over to data communication network 120 where UE 102 can likely obtain adequate gaming and voice channels. The signal strength difference used by LTE network 110 to trigger a hand-over to data communication network 120 is lower for the QCI combination of QCI 1 and QCI 3 than for a QCI combination having QCI 1 and not QCI 3.

Consider an example where a UE 102 has LTE bearers 153-154 with the QCI combination of 1 (voice call) and 4 (video download). Additional bearers and QCIs could be present. The user may desire to protect their QCI 4 video download bearer over their QCI 1 voice bearer—even if the voice bearer is subsequently replaced or released. Thus, the signal strength difference used by LTE network 110 to trigger a hand-over to voice network 130 is greater for the QCI combination of QCI 1 and QCI 4 than for a QCI combination having QCI 1 and not QCI 4. LTE communication network 110 holds onto UE 102 for an additional time to preserve the QCI 4 video download bearer that might be lost on a hand-over to voice communication network 130. The additional time may allow LTE network 110 to hand UE 102 over to data communication network 120 where UE 102 can likely obtain adequate video download and voice channels. The signal strength difference used by LTE network 110 to trigger a hand-over to data communication network 120 is lower for the QCI combination of QCI 1 and QCI 4 than for a QCI combination having QCI 1 and not QCI 4.

Consider an example where a UE 102 has LTE bearers 153-154 with the QCI combination of 1 (voice call) and 6 (message/file transfer). Additional bearers and QCIs could be present. The user may desire to protect their QCI 6 message/file transfer bearer over their QCI 1 voice bearer—even if the voice bearer is subsequently replaced or released. Thus, the signal strength difference used by LTE network 110 to trigger a hand-over to voice network 130 is greater for the QCI combination of QCI 1 and QCI 6 than for a QCI combination having QCI 1 and not QCI 6. LTE communication network 110 holds onto UE 102 for an additional time to preserve the QCI 6 message/file transfer bearer that might be lost on a hand-over to voice communication network 130. The additional time may allow LTE network 110 to hand UE 102 over to data communication network 120 where UE 102 can likely obtain adequate message/file transfer and voice channels. The signal strength difference used by LTE network 110 to trigger a hand-over to data communication network 120 is lower for the QCI combination of QCI 1 and QCI 6 than for a QCI combination having QCI 1 and not QCI 6.

Consider an example where a UE 102 has LTE bearers 153-154 with the QCI combination of 1 (voice call) and 7 (media streaming). Additional bearers and QCIs could be present. The user may desire to protect their QCI 7 media streaming bearer over their QCI 1 voice bearer—even if the voice bearer is subsequently replaced or released. Thus, the signal strength difference used by LTE network 110 to trigger a hand-over to voice network 130 is greater for the QCI combination of QCI 1 and QCI 7 than for a QCI combination having QCI 1 and not QCI 7. LTE communication network 110 holds onto UE 102 for an additional time to preserve the QCI 7 media streaming bearer that might be lost on a hand-over to voice communication network 130. The additional time may allow LTE network 110 to hand UE 102 over to data communication network 120 where UE 102 can likely obtain adequate media streaming channels—including a voice channel. The signal strength difference used by LTE network 110 to trigger a hand-over to data communication network 120 is lower for the QCI combination of QCI 1 and QCI 7 than for a QCI combination having QCI 1 and not QCI 7.

Figure 2:
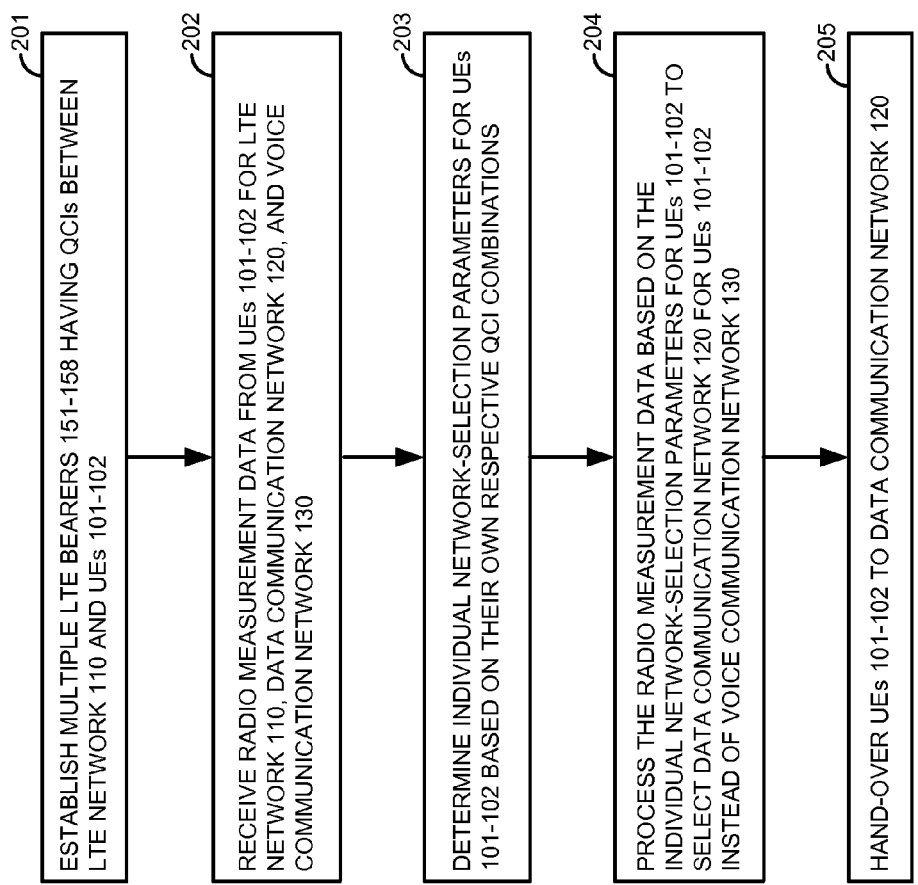

FIG. 2 illustrates the operation of communication system 100 to control hand-overs from LTE network 110 for UEs 101-102 based on their individual QCI combinations. UEs 101-102 and LTE communication network 110 establish bearers 151-156 to exchange wireless data using associated QCIs (201). The QCIs have associated priorities, latencies, error rates, bandwidths, and services. LTE communication network 110 wirelessly receives radio measurement data from UEs 101-102 for communication networks 110, 120, and 130 (202). The radio measurement data indicates network identifiers, wireless signal strengths, data latencies, data errors, noise levels, and/or some other communication characteristics.

LTE communication network 110 determines network-selection parameters for UEs 101-102 based on their individual combination of QCIs for their respective bearers 151-153 and 154-156 (203). The network-selection parameters might by signal strength differences, hysteresis control timers, network loading, radio noise levels, and the like. LTE communication network 110 processes the radio measurement data for UEs 101-102 based on their individual network-selection parameters to select data communication network 120 for UEs 101-102 instead of LTE communication network 110 or voice communication network 130 (204). For example, LTE communication network 110 may adjust signal-strength handover triggers to drive UEs 101-102 toward data communication network 120 instead of voice communication network 130 for particular QCI combinations. LTE network 110 transfers UEs 101-102 to data communication network 120 (205).

Figure 3:
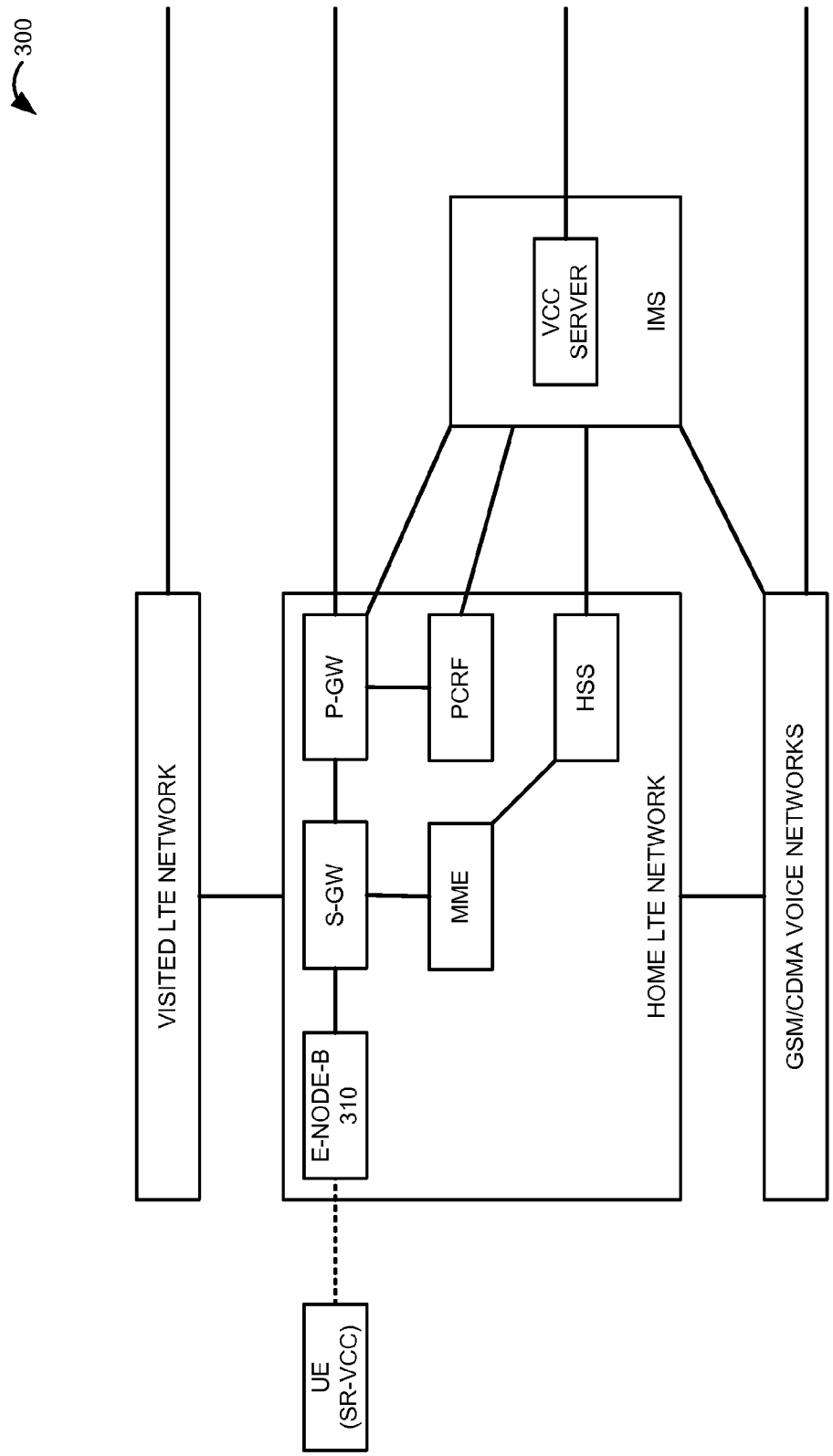
FIGS. 3-4 illustrate a communication system to control SR-VCC hand-overs for an LTE UE based on its QCI combination.

FIG. 3 illustrates communication system 300 to control Single Radio Voice Call Continuity (SR-VCC) hand-overs for a SR-VCC UE based on its QCI combinations. Communication system 300 is an example of communication system 100, although system 100 may use alternative configurations and operations. Communication system 300 comprises: SR-VCC User Equipment (UE), home LTE network, Internet Multimedia Subsystem (IMS), visited LTE network, and multiple GSM and/or CDMA voice networks. The home LTE network comprises: eNodeB 310, Service Gateway (S-GW), Packet Data Network Gateway (P-GW), Mobility Management Entity (MME), Policy Charging and Rules Function (PCRF), and Home Subscriber System (HSS). The IMS comprises VCC server. IMS typically has other systems, such as Call Session Control Functions (CSCFs), Access Transfer Gateway (ATGWs), and the like.

Figure 4:
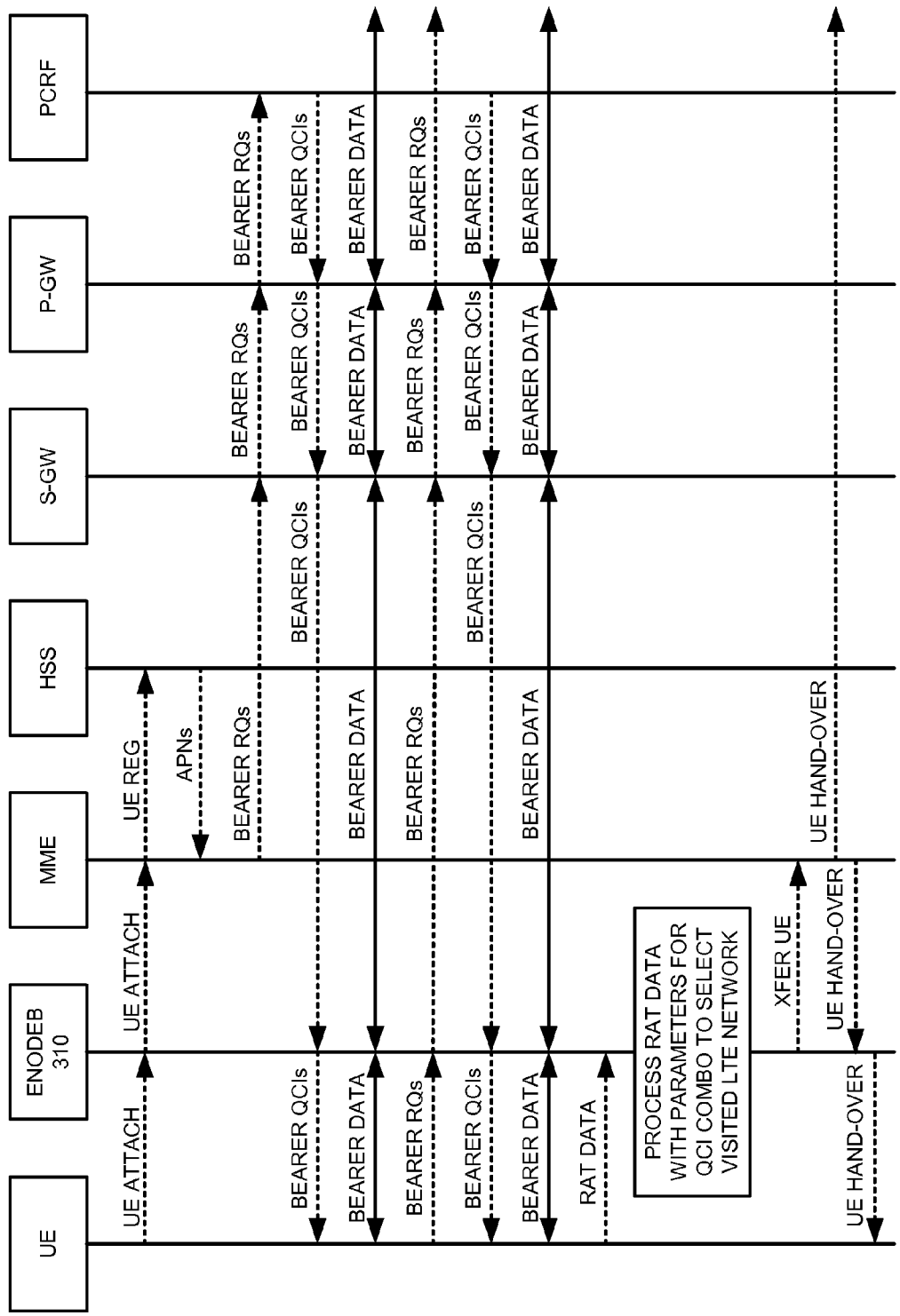

FIG. 4 illustrates the operation of communication system 300 to control SR-VCC hand-overs for the UE based on its QCI combination. The UE initially performs wireless attachment to eNodeB 310, and eNodeB 310 transfers an attachment message for the UE to the MME. The MME transfer an LTE registration for the UE to the HSS. The HSS processes the LTE registration and returns Access Point Names (APNs) for various service, such as internet access and voice calling. The UE would typically be identified as an SR-VCC device at this point. In response to the APNs, the MME transfers default bearer requests to the S-GW. The S-GW transfers the bearer requests to the P-GW. The P-GW interacts with the PCRF to obtain QoS Class Indicators (QCs) for the default bearers. The P-GW selects IP addresses for the UE and transfers QCIs and IP addresses to the S-GW for subsequent transfer to eNodeB 310 and the UE. The UE then exchanges bearer data with various systems over eNodeB 310 and the gateways over the default bearers. This might include SR-VCC signaling.

The UE uses the default bearers to request additional dedicated bearers through eNodeB 310 (although the dedicated bearer requests for the UE may come from other entities as well). eNodeB 310 transfers the dedicated bearer requests to the S-GW which transfers the requests to the P-GW. The P-GW interacts with the PCRF to obtain QCIs for the dedicated bearers. The P-GW transfers QCI and IP address information to the S-GW for subsequent transfer to eNodeB 310 and the UE. The UE then exchanges additional bearer data with various systems through eNodeB 310 and the gateways over the dedicated bearers. At this point, the UE has multiple bearers each having a QCI to form a QCI combination for the UE. Some of the dedicated bearers might carry SR-VCC voice communications.

The UE also transfers Radio Access Technology (RAT) measurement data to eBodeB 310. The RAT data includes signal strength and other data for the LTE and voice networks. To process the RAT data, eNodeB 310 determines hand-over parameters for the UE based on its current QCI combination. For example, eNodeB 310 may increase the signal strength difference required to trigger a hand-over to the voice networks while decreasing the signal strength difference required to trigger a hand-over to the visited LTE network. Thus, the home LTE network would direct the UE to the visited LTE network instead of to the voice network. This might be desireable where the visited LTE network better supports the entire QCI combination for the UE along with supplying an adequate level of voice/messaging capability.

In a different example, eNodeB 310 may decrease the signal strength difference required to trigger a hand-over to the voice networks while increasing the signal strength difference required to trigger a hand-over to the visited LTE network. Thus, the home LTE network would direct the UE to the voice network instead of to the visited LTE network. This might be desirable where the visited LTE cannot support the QCI combination for the UE or cannot supply an adequate level of voice/messaging capability.

In this example, eNodeB 310 selects the visited LTE network for the UE base on its current QCI combination and the RAT measurements. eNodeB 310 then instructs the MME to transfer the UE to the visited LTE network. The MME sends UE hand-over messaging to eNodeB 310 for delivery to the UE. The MME also sends UE hand-over messages to the visited LTE network to perform the hand-over.

Figure 5:
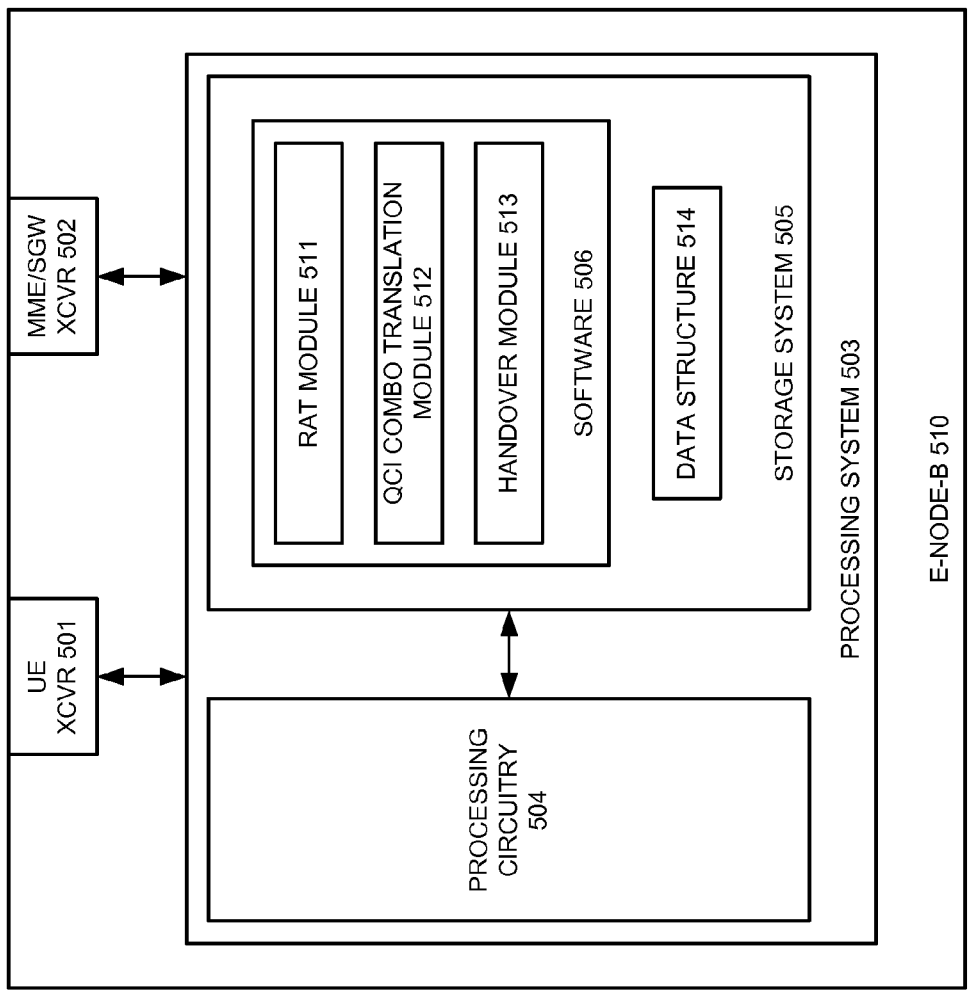

FIG. 5 illustrates LTE eNodeB 510 having data structure 514 to control hand-overs for LTE UEs based on their individual QCI combinations. LTE eNodeB 510 is an example of systems 110 and 310, although these systems may use alternative configurations and operations. LTE eNodeB 510 comprises UE transceiver 501, MME/SGW transceiver 502, and processing system 503. Processing system 503 comprises processing circuitry 504 and storage system 505. Storage system 505 stores software 506 and data structure 514. Software 506 includes software modules 511-513. Some conventional aspects of eNodeB 510 are omitted for clarity, such as power supplies, enclosures, and the like. eNodeB 510 may be centralized or distributed and may include various virtualized components.

UE transceiver 501 comprises wireless communication components, such as antennas, amplifiers, filters, modulators, schedulers, and the like. MME/SGW transceiver 502 comprises network communication components, such as ports, signal processors, and network interfaces. In processing system 503, processing circuitry 504 comprises circuit boards, integrated circuitry, and associated electronics. Storage system 505 comprises non-transitory, machine-readable, data storage media, such as flash drives, disc drives, memory circuitry, servers, and the like. Software 506 comprises machine-readable instructions that control the operation of processing circuitry 504 when executed. Software 506 includes software modules 511-513, data structure 514, and may also include operating systems, applications, utilities, databases, and the like. All or portions of software 506 may be externally stored on one or more storage media, such as flash drives, discs, servers, and the like.

When executed by processing circuitry 504, RAT module 511 directs circuitry 504 to process RAT measurement data based on various parameters to select networks for UEs. When executed by processing circuitry 504, QCI combination translation module 512 directs circuitry 504 to process data structure 514 to translate QCI combinations into at least some of the parameters used by RAT module 511 to process the RAT data to select the networks. When executed by processing circuitry 504, handover module 513 directs circuitry 504 to exchange hand-over messages between the network nodes to transfer UEs from the home LTE network to the other networks based on the network selections. Data structure 514 maintains database associations between individual QCI combinations and hand-over parameter sets—possibly on a per-UE basis.

FIG. 6 illustrates data structure 514 to control hand-overs for LTE UEs based on their individual QCI combinations. The first column shows various QCI combinations. The next six columns list handover parameters for various networks including signal strength deltas and hysteresis timers. The signal strength delta is the difference in signal strength relative to the home LTE network before a hand-over is triggered. For example, the signal strength of the visited home LTE network should exceed the signal strength of the home LTE network by 4 dB to trigger a hand-over for the QCI combination 1, 5, 9, but the signal strength of the visited LTE network should exceed the signal strength of the home LTE network by only 3 dB to trigger a hand-over for the QCI combination 1, 2, 5, 9.

The hysteresis timer is used before a hand-over to allow differences in signal strength to settle and avoid ping-pong transitions between networks. For example, the hysteresis timer for transfer to the visited LTE network is 5 mS for the QCI combination 1, 5, 9, but the hysteresis timer for visited LTE network is 10 mS for the QCI combination 1, 2, 5, 9. It should be appreciated that the various signal strength deltas and hysteresis timers are illustrative and other values could be used. The various values may be designed to direct UEs leaving the home LTE network to a visited LTE network or a WiFi network that can better serve the UE given their current QCI combination.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Long Term Evolution (LTE) network comprising:
   wirelessly exchanging data with a User Equipment (UE) over multiple data bearers having a combination of Quality-of-Service Class Indicators (QCIs);
   wirelessly receiving radio measurement data from the UE for a voice communication network and for a data communication network;
   determining at least one network-selection parameter based on the combination of the QCIs for the UE; and
   processing the radio measurement data based on the at least one network-selection parameter to select the data communication network for the UE instead of the voice communication network.

2. The method of claim 1 wherein the at least one network-selection parameter comprises an increase in signal strength difference to trigger a hand-over from the LTE communication network to the voice communication network.

3. The method of claim 1 wherein the at least one network-selection parameter comprises a decrease in signal strength difference to trigger a hand-over from the LTE communication network to the data communication network.

4. The method of claim 1 wherein the at least one network-selection parameter comprises an increase in a first signal strength difference to trigger a hand-over from the LTE communication network to the voice communication network and a decrease in a second signal strength difference to trigger a hand-over from the LTE communication network to the data communication network.

5. The method of claim 1 wherein the combination of the QCIs comprises multiple Guaranteed Bit Rate (GBR) QCIs.

6. The method of claim 1 wherein:
   the combination of the QCIs comprises at least QCI 1 and QCI 2;
   the at least one network-selection parameter comprises an enhanced signal strength difference that is greater than another signal strength difference used by the LTE access system for other UEs having only the QCI 1 and not the QCI 2.

7. The method of claim 1 wherein:
   the combination of the QCIs comprises at least QCI 1 and QCI 3;
   the at least one network-selection parameter comprises an enhanced signal strength difference that is greater than another signal strength difference used by the LTE access system for other UEs having only the QCI 1 and not the QCI 3.

8. The method of claim 1 wherein:
   the combination of the QCIs comprises at least QCI 1 and QCI 4;
   the at least one network-selection parameter comprises an enhanced signal strength difference that is greater than another signal strength difference used by the LTE access system for other UEs having only the QCI 1 and not the QCI 4.

9. The method of claim 1 wherein:
   the combination of the QCIs comprises at least QCI 1 and QCI 6;
   the at least one network-selection parameter comprises an enhanced signal strength difference that is greater than another signal strength difference used by the LTE access system for other UEs having only the QCI 1 and not the QCI 6.

10. The method of claim 1 wherein:

the combination of the QCIs comprises at least QCI 1 and QCI 7;

the at least one network-selection parameter comprises an enhanced signal strength difference that is greater than another signal strength difference used by the LTE access system for other UEs having only the QCI 1 and not the QCI 7.

11. A Long Term Evolution (LTE) network comprising:

a radio transceiver system configured to wirelessly exchange data with a User Equipment (UE) over multiple data bearers having a combination of Quality-of-Service Class Indicators (QCIs) and to wirelessly receive radio measurement data from the UE for a voice communication network and for a data communication network;

a processing system configured to determine at least one network-selection parameter based on the combination of the QCIs for the UE, process the radio measurement data based on the at least one network-selection parameter to select the data communication network for the UE instead of the voice communication network.

12. The LTE network of claim 11 wherein the at least one network-selection parameter comprises an increase in signal strength difference to trigger a hand-over from the LTE communication network to the voice communication network.

13. The LTE network of claim 11 wherein the at least one network-selection parameter comprises a decrease in signal strength difference to trigger a hand-over from the LTE communication network to the data communication network.

14. The LTE network of claim 11 wherein the at least one network-selection parameter comprises an increase in a first signal strength difference to trigger a hand-over from the LTE communication network to the voice communication network and a decrease in a second signal strength difference to trigger a hand-over from the LTE communication network to the data communication network.

15. The LTE network of claim 11 wherein the combination of the QCIs comprises multiple Guaranteed Bit Rate (GBR) QCIs.

16. The LTE access system of claim 11 wherein:

the combination of the QCIs comprises at least QCI 1 and QCI 2;

the at least one network-selection parameter comprises an enhanced signal strength difference that is greater than another signal strength difference used by the LTE access system for other UEs having only the QCI 1 and not the QCI 2.

17. The LTE access system of claim 11 wherein:

the combination of the QCIs comprises at least QCI 1 and QCI 3;

the at least one network-selection parameter comprises an enhanced signal strength difference that is greater than another signal strength difference used by the LTE access system for other UEs having only the QCI 1 and not the QCI 3.

18. The LTE access system of claim 11 wherein:

the combination of the QCIs comprises at least QCI 1 and QCI 4;

the at least one network-selection parameter comprises an enhanced signal strength difference that is greater than another signal strength difference used by the LTE access system for other UEs having only the QCI 1 and not the QCI 4.

19. The LTE access system of claim 11 wherein:

the combination of the QCIs comprises at least QCI 1 and QCI 6;

the at least one network-selection parameter comprises an enhanced signal strength difference that is greater than another signal strength difference used by the LTE access system for other UEs having only the QCI 1 and not the QCI 6.

20. The LTE access system of claim 11 wherein:

the combination of the QCIs comprises at least QCI 1 and QCI 7;

the at least one network-selection parameter comprises an enhanced signal strength difference that is greater than another signal strength difference used by the LTE access system for other UEs having only the QCI 1 and not the QCI 7.

* * * * *